(12) United States Patent
Moriya et al.

(10) Patent No.: US 7,586,547 B2
(45) Date of Patent: *Sep. 8, 2009

(54) VIDEO SIGNAL SWITCHING APPARATUS AND CONTROL METHOD THEREFOR

(75) Inventors: Yoshinari Moriya, Tokyo (JP); Atsushi Kouda, Kanagawa (JP); Harutoshi Matsushita, Kanagawa (JP); Tetsuro Tsubota, Kanagawa (JP); Kenji Inoue, Kanagawa (JP); Chikatomo Nakasaka, Shizuoka (JP)

(73) Assignee: Sony Corporation, Tokyo (JP)

(*) Notice: Subject to any disclaimer, the term of this patent is extended or adjusted under 35 U.S.C. 154(b) by 490 days.

This patent is subject to a terminal disclaimer.

(21) Appl. No.: 11/416,238

(22) Filed: May 2, 2006

(65) Prior Publication Data

US 2006/0206549 A1     Sep. 14, 2006

Related U.S. Application Data

(63) Continuation of application No. 10/311,739, filed as application No. PCT/JP02/03999 on Apr. 22, 2002, now Pat. No. 7,042,516.

(30) Foreign Application Priority Data

Apr. 20, 2001   (JP) ............................ 2001-122857

(51) Int. Cl.
  *H04N 5/268*   (2006.01)
  *H04N 5/44*    (2006.01)

(52) U.S. Cl. ...................... 348/705; 348/553

(58) Field of Classification Search ......... 348/552–555, 348/571, 575, 725, 460, 474, 705, 706; 725/131–134, 725/150, 141
See application file for complete search history.

(56) References Cited

U.S. PATENT DOCUMENTS 4,908,751 A   3/1990   Smith
(Continued)

FOREIGN PATENT DOCUMENTS

JP   59-86340   5/1984
(Continued)

OTHER PUBLICATIONS

Kenrokukan Publishing Corp., Tokushu: Digital Console no Genzai Fulldigital Mixing Console Studer D950M2, Hoso Gijitsu, Jan. 1, 2002, vol. 55, No. 1, pp. 64 to 71.
(Continued)

*Primary Examiner*—M. Lee
(74) *Attorney, Agent, or Firm*—Frommer Lawrence & Haug LLP; William S. Frommer; Ellen Marcie Emas

(57) ABSTRACT

The present invention is directed to a video signal switching apparatus having editing function to select an arbitrary video signal from plural video signals or carry out synthesis thereof, which allows an operation unit to be of modular configuration every respective functions to electrically connect adjacent modules of panel modules (22A to 22D) which serve as respective operation modules to each other by relay bases (23), (24) to carry out transmission of signals between both modules, and to allow connection between the panel modules (22A to 22D) and the relay bases (23), (24) to be connector connection to thereby have ability to freely change layout of the panel modules (22B to 22D) of division size in which 19 inches rack size is fundamental in accordance with fondness of operator.

6 Claims, 9 Drawing Sheets

U.S. PATENT DOCUMENTS

| | | | |
|---|---|---|---|
| 5,014,189 A * | 5/1991 | Tamitani | 712/13 |
| 5,526,017 A | 6/1996 | Wilkie | |
| 5,619,250 A | 4/1997 | McClellan et al. | |
| 6,469,742 B1 | 10/2002 | Trovato et al. | |

FOREIGN PATENT DOCUMENTS

| JP | 3-155232 | 7/1991 |
|---|---|---|
| JP | 5-64077 | 3/1993 |

OTHER PUBLICATIONS

Kenrokukan Publishing Corp., Tokushu: Digital Console no Genzai Digital Console $MC^2$, Hoso Gijutsu Jan. 1, 2002, vol. 55, No. 1, pp. 83 to 88.

* cited by examiner

VIDEO SIGNAL SWITCHING APPARATUS AND CONTROL METHOD THEREFOR

This is a continuation of application Ser. No. 10/311,739, filed Dec. 19, 2002 now U.S. Pat. No. 7,042,516, which is a 371 of PCT/JP02/03999, filed Apr. 22, 2002 and claims priority to Japanese patent application 2001-122857, filed Apr. 20, 2001, the entirety of which is incorporated herein by reference.

TECHNICAL FIELD

The present invention relates to a video signal switching apparatus having editing function to select an arbitrary video signal from plural video signals, or to carry out synthesis thereof, and to give various special effects to image, and a control method therefore.

BACKGROUND ART

A video signal switching apparatus having editing function to select an arbitrary video signal from plural video signals, or to carry out synthesis thereof, and to give various special effects to image is called a video switcher, and is adapted so that plural television cameras or plural video tape recorders (VTRs), etc. are caused to be video signal sources to select an arbitrary video signal from plural video signals supplied from these video signal sources in accordance with switching operation of operator, or to synthesize a specific video signal or character information, etc. with respect to the selected video signal. In recent years, with advancement of digitization of VTR, etc., digitization advances also in the video switcher.

With advancement of digitization of the video switcher, not only the effect to merely carry out switching of video signals, but also editing function to give various special effects, e.g., dissolve, wipe, fade-in/fade-out, etc. to image by DME (Digital Motion Effect) or DVE (Digital Video Effect), etc. have been added to the video switcher.

The video switcher comprises an operating panel (console) provided with switches and/or fader levers, etc. comprising operation buttons for selecting video signals and/or for selecting various digital effects. In the operation on the operating panel, in the case where, e.g., special effect such as wipe, etc. for displaying other image in such a manner to wipe off image being displayed is given, the fader lever is ordinarily operated to thereby control the degree of advancement of switching of image. Namely, image is switched in accordance with quantity of operation and operation speed of the fader lever.

As stated above, since the editing function to produce various special effects is provided at the video switcher in addition to the function to carry out switching of video signals, that operating panel is divided into plural systems, and is divided, every respective systems, into plural switch operation units in which a large number of switches for merely switching video signals, etc. are disposed and plural lever operation units in which fader levers for giving special effects, etc. are disposed, etc.

In the conventional video switcher, the operating panel in which switch operation units and lever operation units, etc. are disposed every plural systems is integrally constituted, and is formed as product in the state where arrangement order of plural systems and/or layout of plural switch operation units and plural lever operation units are fixed. Accordingly, in the case where user desires a video switcher of favorite arrangement order and/or layout, it is inevitable to give an order as an apparatus of the special specification. For this reason, cost extremely becomes high.

Even if user purchases the video switcher of the standard specification at a relatively low cost, in the case where operation unit which is not required for that user, etc. is assembled, user does not use that operation unit. Accordingly, burden in point of cost is applied to user as the result thereof. Further, even after the video switcher is purchased, there naturally also takes place the case where there is a need to change arrangement order and/or layout in dependency upon difference of operability by right-handness or left-handness of operator and/or fondness of operator, etc. However, the conventional video switcher could not cope with such request.

Disclosure of the Invention

The present invention has been proposed in view of actual circumstances as described above, and an object of the present invention is to provide a video signal switching apparatus and a control method therefore which can freely change setting of arrangement order of plural systems and/or layout of plural switch operation units and plural lever operation units in accordance with fondness of user.

A video signal switching apparatus according to the present invention comprises plural operation modules disposed on a base unit, a relay base (substrate) for electrically connecting adjacent modules of these plural operation modules to each other to carry out transmission of signals between both modules, and a control unit for controlling the plural operation modules while carrying out management of information relating to respective functions of the plural operation modules. This video signal switching apparatus carries out a control so as to acquire predetermined module identification information and operation information of respective modules from respective ones of the plural operation modules while carrying out management of information relating to respective functions of the plural operation modules to supply display information to respective ones of the plural operation modules while making reference to management information on the basis of this acquired operation information.

The video signal switching apparatus according to the present invention is caused to be of the configuration in which the operation unit is caused to be modular configuration every respective function so that attachment position of relay means at electrical connection between respective mutual operation modules is adapted in a manner attached at a desired position, and width of module is caused to be a desired width, thereby making it possible to freely change setting of respective functions of operation units, i.e., layout of operation modules in accordance with fondness of operator. In the case where the wiring system is caused to be relay base connection, since it is not required to employ the configuration of harness connection, assembling ability can be improved and unnecessary radiation can be suppressed. As the relay means, relay means employing harness connection may be also used without using relay base as described above. Further, respective panel modules are caused to undergo management on the basis of identification information, and transmission/reception of information are carried out between the panel modules and respective operation modules on the basis of that management information, thereby also making it possible to change functions of operation modules.

Still further objects of the present invention and more practical merits obtained by the present invention will become more apparent from the description of the embodiments which will be given below with reference to the attached drawings.

BEST MODE FOR CARRYING OUT THE INVENTION

Explanation will now be given in detail with reference to the attached drawings in connection with the embodiments of the present invention.

Figure 1:
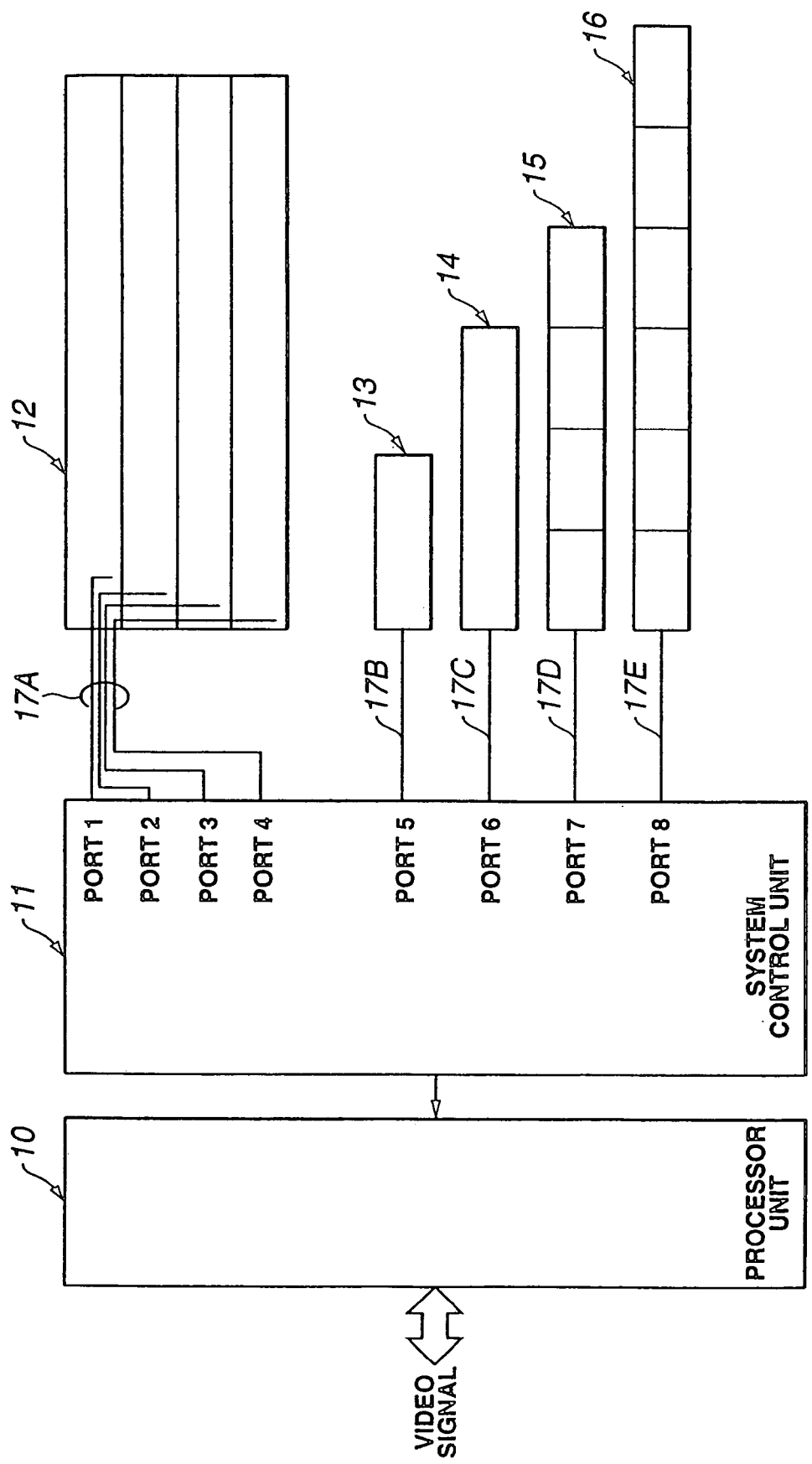
FIG. 1 is a block diagram of a video switcher showing an embodiment of a video signal switching apparatus to which the present invention is applied.

FIG. 1 is a block diagram schematically showing the configuration of a video switcher which is a video signal switching apparatus to the present invention is applied. As is clear from FIG. 1, the video switcher according to the present invention comprises, as shown in FIG. 1, a system configuration including a processor unit 10, a system control unit 11, a main panel unit 12, a menu panel unit 13, and first to third expansion panel units 14 to 16, wherein the system control unit 11 and the respective panel units 12 to 16 are connected by cords 17A to 17E.

Plural video signals are inputted from plural video signal sources (not shown) such as television cameras or VTRs, etc. to the processor unit 10. The processor unit 10 executes, under control from the system control unit 11, processing for selecting a specific video signal from plural video signals, processing for synthesizing plural video signals and processing for giving special effects to video signals, etc. to output the processed video signals.

The system control unit 11 has eight systems of port 1 to port 8 as the control system of the panel, wherein control of the main panel 12 is carried out by four systems (port 1 to port 4) among them, control of the menu panel unit 13 is carried out by one system (port 5), and control of the expansion panel units 14 to 16 is carried out by the remaining three systems (port 6 to port 8). Between the system control unit 11 and the main panel unit 12, the menu panel unit 13 and the expansion panel units 14 to 16, transmission of control signals and data is carried out by the cords 17A to 17E at high speed transmission in which data compression technology is applied. More practical configuration of the system control unit 11 will be described later.

Then, more practical configuration of the main panel unit 12 will be explained. In the main panel unit 12 of this example, there is employed the configuration in which the operation unit is caused to be of modular configuration every respective function so that setting of layout of respective operation modules can be freely changed.

Figure 2:
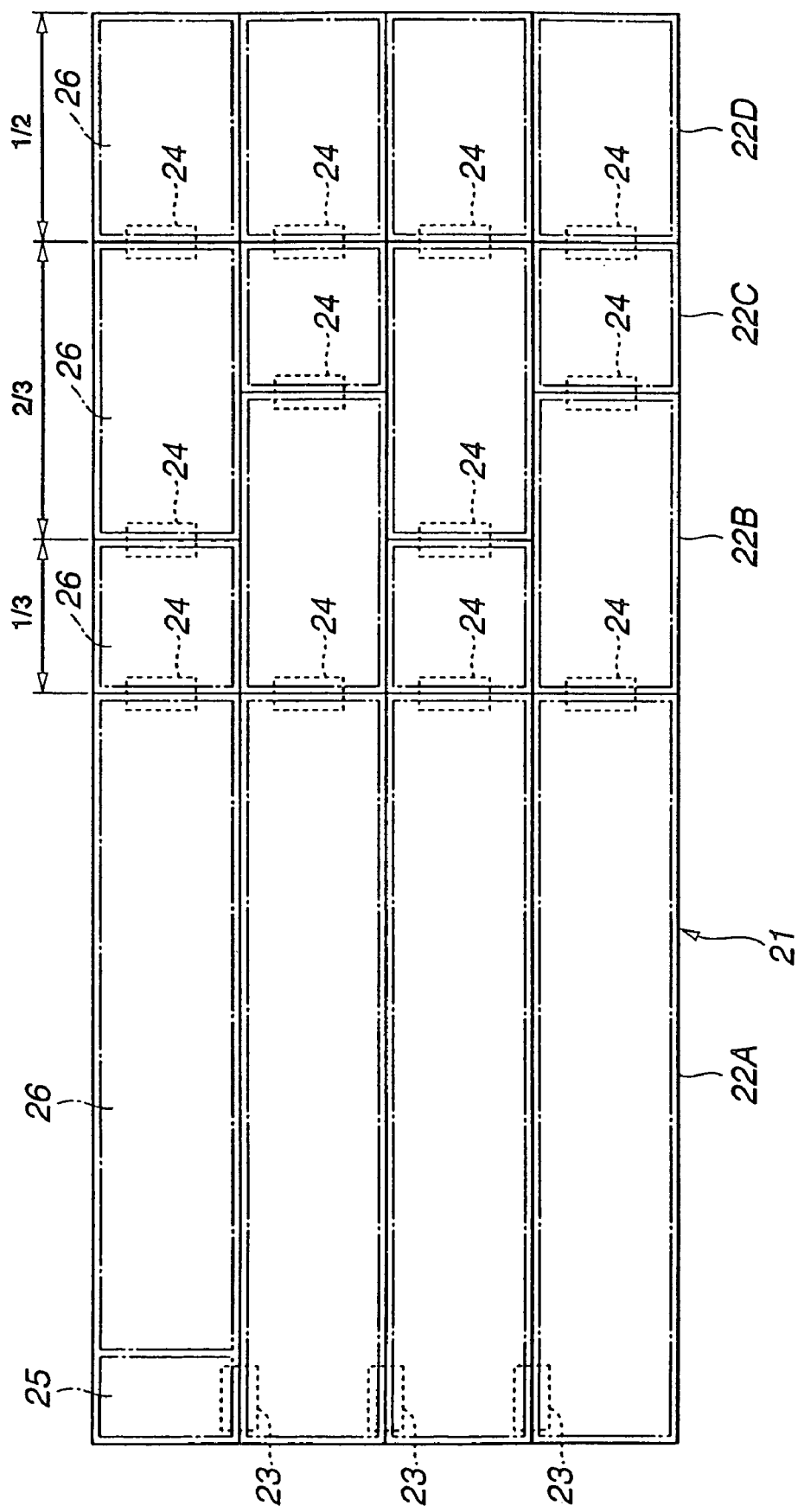
FIG. 2 is a schematic plan view showing an example of main panel unit of the video switcher.

An example of the configuration of the main panel unit 12 is shown in FIG. 2. In the main panel unit 12 according to this example, the operation system is divided into, e.g., four systems so that realization of various functions such as execution of function at respective independent systems (rows) and/or execution of relevant function between plural systems, etc. can be made. Accordingly, a base unit 21 of the operating panel has the structure that four conduits of one row unit are connected in correspondence with the above-described four systems. With respect to these four conduits of rows, plural operation modules caused to be of modular configuration (hereinafter referred to as panel modules) 22A to 22D are arranged. Here, the base unit 21 may be adapted to determine a predetermined size in advance to assemble desired operation modules in a manner conforming to that size, but the structure of the base unit may be also definitely determined on the basis of sizes or layout of plural desired panel modules, etc. by employing the configuration of the invention of the present application.

As is clear from FIG. 2, the panel modules 22A to 22D respectively have different lateral widths. Respective lateral widths of these panel modules 22A to 22D are prescribed as follows. Namely, since width of general rack which mounts broadcasting equipment, etc. is, e.g., 19 inches rack width, respective widths of the panel modules 22B to 22D are caused to be division size with 19 inches rack size being fundamental quantity apart from the panel module 22A having the maximum lateral width in which a large number of operation buttons which respectively operate switches are arranged. It is not required that the mount width is 19 inches rack size. The width of the panel module is not limited to division size of the width of the base unit or the panel module, but may be determined in accordance with function that the panel module is caused to have such as the number of buttons arranged or arrangement thereof.

For example, respective widths of the panel modules 22B to 22D are set to widths of $1/6$, $1/3$, $1/2$, $2/3$ of the 19 inches rack size. Explanation will be given below by taking it as an example. In the example of FIG. 2, the panel module 22B has a width which is $2/3$ of the 19 inches rack size, the panel module 22C has a width which is $1/3$ of the 19 inches rack size, and the panel module 22D has a width which is $1/2$ of the 19 inches rack size. It is to be noted that lateral width of the panel module 22A is determined in accordance with, e.g., the number of buttons arranged, etc.

The width of the operation module is determined in accordance with the function that the operation module is caused to have such as the number of buttons, and can be determined by a desired width. For example, in the case where respective widths of the panel modules 22B to 22D are caused to be division size in which the 19 inches rack size is caused to be fundamental quantity as described above, it is possible to freely change layout of the panel modules 22B to 22D, and it becomes possible to mount the panel modules 22B to 22D with respect to the rack by one body to use them similarly to other broadcasting equipment. In addition, kinds of sizes of the panel modules 22A to 22D are unified so that mass-production including realization of metal mold of the panel modules 22A to 22D can be made. For this reason, low cost by that mass-production effect can be realized.

With respect to change of layout of the panel modules 22B to 22D, change of layout between the mutual panel modules 22B to 22D set in advance at the main panel unit 12 can be of course made, and panel modules of the above-described division size having specific function are separately prepared so that replacement into those panel modules can be made. By this replacement of panel module, different function can be freely added to the main panel unit 12 afterwards in accordance with fondness of user.

As the base unit 21, base units of plural kinds of lateral widths (panel sizes) determined by combination of division sizes can be prepared. Examples of combinations of respective sizes of the panel modules 22A to 22D are shown in FIGS. 3A to 3E. In all examples, division sizes in which 19 inches rack size (hereinafter simply referred to as rack size) is caused to be fundamental quantity are combined with respect to the panel module 22A.

Figure 3A:
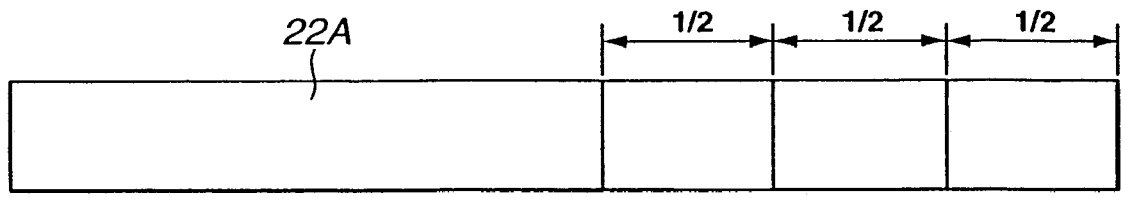
FIGS. 3A to 3E are views showing combination examples of sizes of panel modules.
Figure 3B:
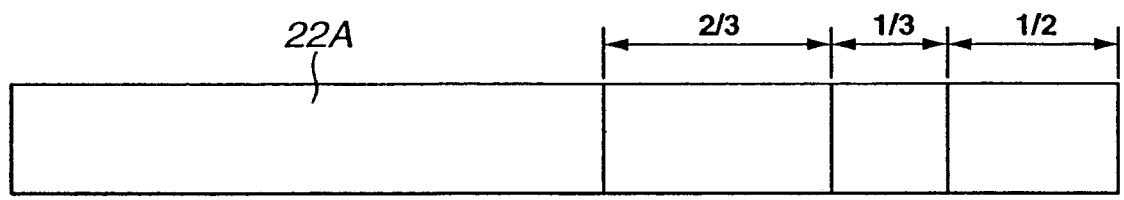
Figure 3C:
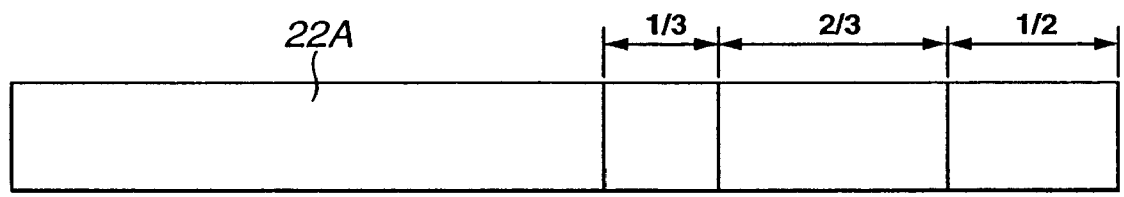
Figure 3D:
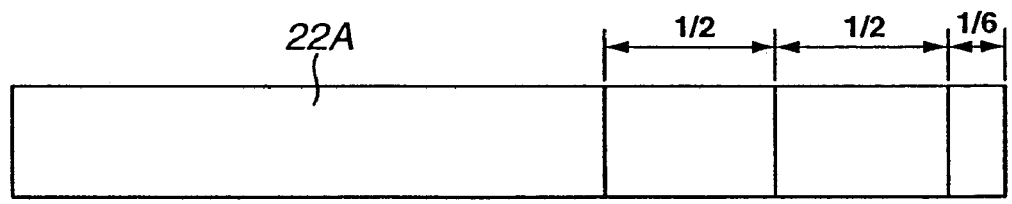
Figure 3E:
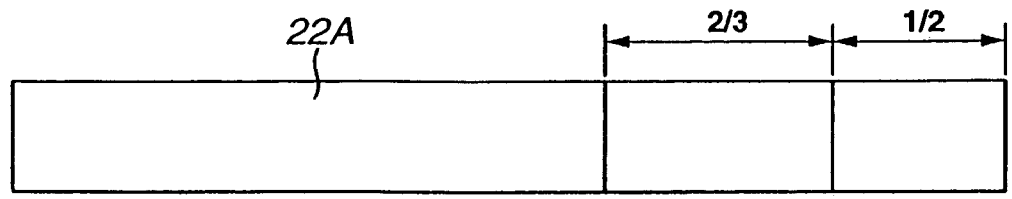

FIG. 3A shows the case where three panel modules of ½ rack size are combined, FIG. 3B shows the case where respective panel modules of ⅔ rack size, ⅓ rack size and ½ rack size are combined in order, FIG. 3C shows the case where respective panel modules of ⅓ rack size, ⅔ rack size and ½ rack size are combined in order, FIG. 3D shows the case where two panel modules of ½ rack size and one panel module of ⅙ rack size are combined, and FIG. 3E shows the case where respective panel modules of ⅔ rack size and ½ rack size are combined.

In these combination examples, there exist two kinds of widths of the base unit 21. It is to be noted that since the width of the panel module 22A is determined in accordance with the number of buttons arranged as previously described, the width of the base unit 21 is also determined in accordance with the width of the panel module 22A. The combination examples of FIGS. 3B and 3C correspond to the example shown in FIG. 2.

Meanwhile, since the operation system such as switches and/or fader levers, etc., and the display system such as LEDs (Light Emitting Diodes) and/or LCDs (Liquid Crystal Displays), etc. are mounted with respect to the panel modules 22A to 22D as described later, it is required to output operation information from the respective panel modules 22A to 22D, and/or to input display information to the respective panel modules 22A to 22D. As transmission means for these information, the configuration of the relay base (substrate) connection is employed in place of employing the configuration of the harness connection in the main panel unit 12 according to this example. The connection means is not limited to such implementation, but the harness connection may be used. There may be employed connection means adapted for directly carrying out attachment/detachment between respective operation modules without intervention of means like relay base (substrate). Namely, it is sufficient that electrical connection is made between operation modules.

In more practical sense, as indicated by dotted lines in FIG. 2, relay bases 23 which electrically connect panel modules 22A of respective rows to each other are disposed between respective rows. Moreover, relay bases 24 which electrically connect adjacent modules of the panel modules 22A to 22D to each other are disposed every respective rows. Further, the relay bases 23, 24 are placed in the state attached to the base unit 21, and the respective panel modules 22A to 22D are detachably connected to these respective relay bases 23, 24 by connectors (not shown).

It is to be noted that the panel modules 22A to 22D are respectively caused to be of three layer structure consisting of panel, module base (keyboard) and case, wherein connectors are disposed at the back side of the module bases and electrical connections are mutually carried out as the result of the fact that these connectors are fitted into connectors disposed at the surface side of the relay bases 23, 24.

If, e.g. relay bases 23, 24 are used as transmission means for information with respect to the panel modules 22A to 22D in a manner as stated above, change of layout of the panel modules 22B to 22D can be freely carried out by simple work which is exchange (taking out and putting in) of connector between bases, and there is merit also in point of countermeasure of unnecessary radiation because harness becomes unnecessary.

It is to be noted that, in correspondence with the fact that layout of the panel modules 22B to 22D can be freely changed, attachment positions with respect to the base unit 21 of the relay bases 24 disposed every respective rows can be changed at pitch of ⅙ rack size which is the minimum module size because respective lateral widths of the panel modules 22B to 22D are division size in which 19 inches rack size is caused to be fundamental quantity. Thus, with respect to the panel modules 22B to 22D having more than ⅓ rack size, setting of layout can be freely changed while maintaining mutual electrical connection between the panel modules 22A to 22D every respective rows. However, attachment position of connection means like relay base 24 can be changed at pitch of the above-described minimum module size. Further, it is unnecessary that attachment can be made, and it is also sufficient that change with respect to either positions of base units can be made or attachment thereto can be made.

Figure 4A:
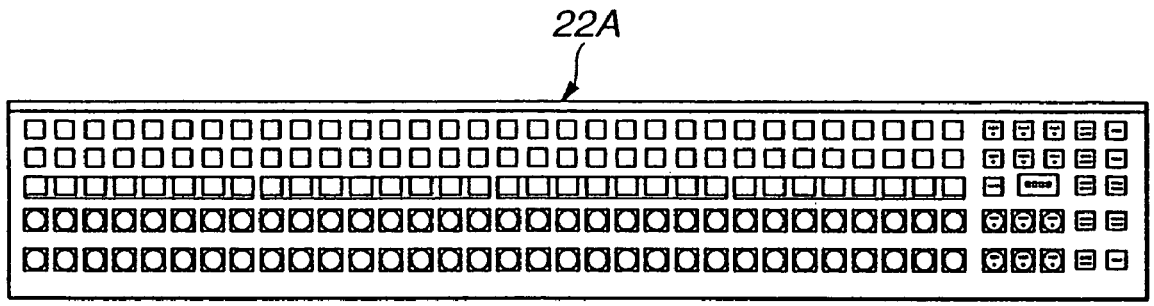
FIGS. 4A to 4D are plan views for explaining the function of panel module.
Figure 4B:
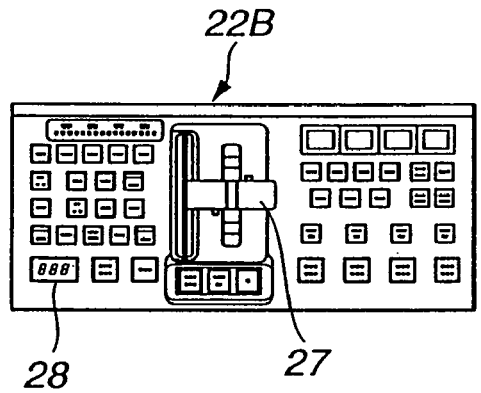
Figure 4C:
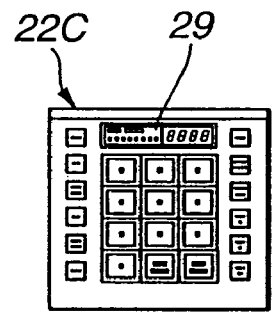
Figure 4D:
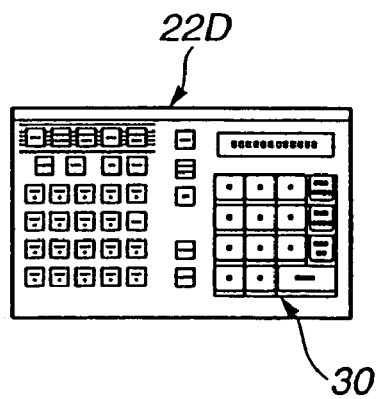

Here, explanation will be given with reference to FIGS. 4A to 4D in connection with an example of function that respective panel modules 22A to 22D have. FIG. 4A shows an example of the panel module 22A, FIG. 4B shows an example of the panel module 22B, FIG. 4C shows an example of the panel module 22C, and FIG. 4D shows an example of the panel module 22D.

The panel module 22A has the configuration that a large number of switches for discriminating or selecting plural video signal sources, e.g., plural television cameras or plural VTRs, or recognizing selected source or a large number of buttons for operating switches, a large number of LEDs, a large number of ANDs (Alpha Numeric Displays), and a large number of source name LCDs/switches with LCDs are arranged every respective source by the number of sources.

The panel module 22B has the configuration that a large number of switches are arranged in addition to a fader lever 27 for controlling advancement degree of switching of image and a LCD 28 for displaying set information such as operation speed thereof, etc. The panel module 22C has the configuration that a large number of switches and LEDs are arranged in addition to a LCD 29. The panel module 22D has the configuration that a large number of switches and LEDs are arranged in addition to a ten-key 30.

It is to be noted that one example is only mentioned here in connection with respective functions (configurations) of panel modules 22A to 22D, and the present invention is not limited to these functions, but can cope with various functions. All of function setting means, etc. such as a large number of switches, etc. of respective modules are not required to have function, but there may be employed function setting means which has not function such as switches preliminarily provided for the purpose of setting change time, etc.

Then, explanation will be given by using the block diagram of FIG. 5 in connection with an example of the circuit configuration of main base (substrate) 25 functioning as interface which governs transmission/reception of control signals/data between the main base 25 and the system control unit 11 and module bases (substrates) 26 (indicated by single dotted lines in FIG. 2) disposed at respective panel modules 22A to 22D.

Power supply voltage is transmitted from the system control unit 11 to the main base (substrate) 25 together with display information given to respective displays (LCD, AND, LED) of the panel modules 22A to 22D. Conversely, operation information obtained from respective switches of the panel modules 22A to 22D are transmitted from the main base (substrate) 25 to the system control unit 11.

Figure 5:
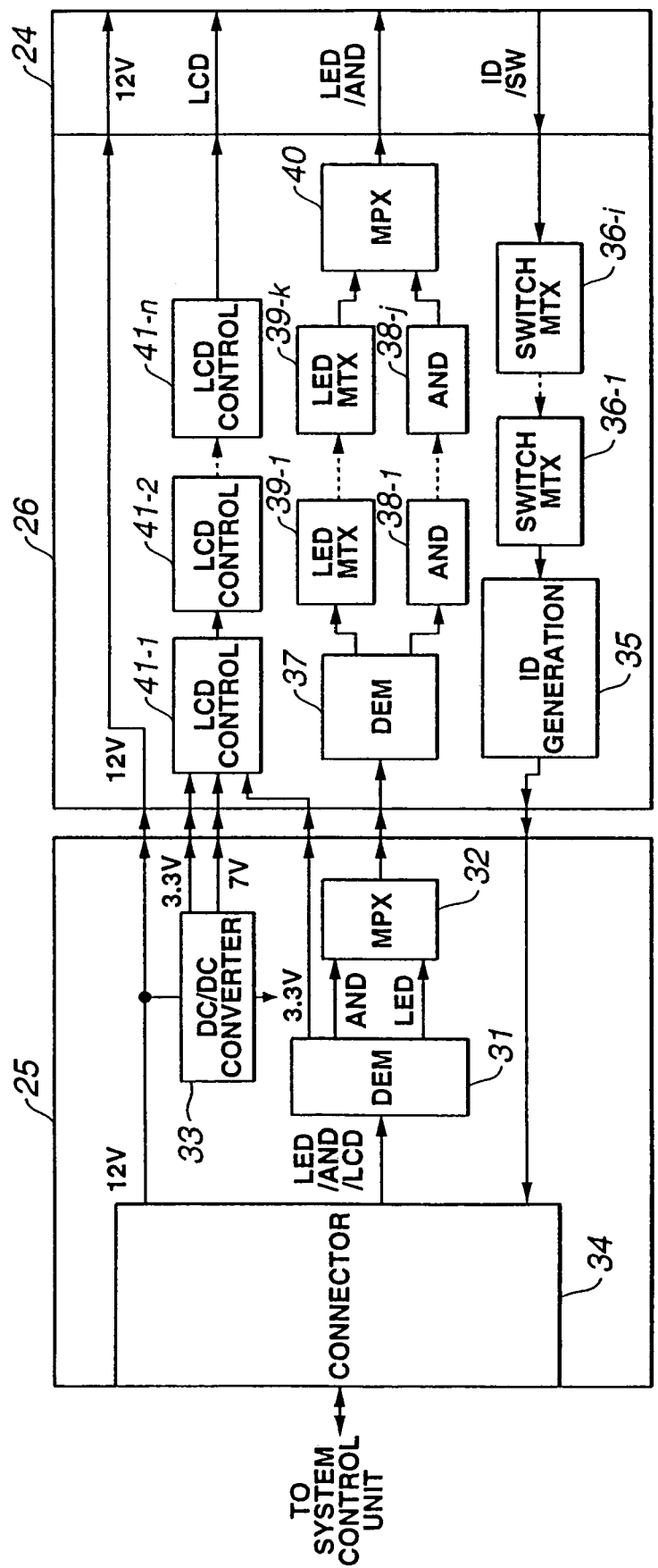
FIG. 5 is a block diagram showing an example of circuit configuration of main base (substrate) and module base (substrate).

In FIG. 5, a demultiplexer 31, a multiplexer 32 and a DC-DC converter 33, etc. are mounted on the main base (substrate) 25. Further, transmission/reception of display information and operation information is carried out through a connector 34 between the main base (substrate) 25 and the system control unit 11. As described later, respective display information of LCD, AND, LED are caused to undergo high speed transmission, e.g., at transmission rate of 240 Mbps after undergone multiplexing at the system control unit 11 side. Respective display information of LCD, AND, LED which have been caused to undergo high speed transmission by this one system are demultiplexed into, e.g., LCD information of transmission rate of 8 Kbps, AND information of transmission rate of 2 Kbps and LED information of transmission rate of 2 Kbps at the demultiplexer 31.

The LCD information is transmitted to the module base (substrate) 26 of the panel module 22A as it is. The AND information and the LED information are multiplexed for a second time at the multiplexer 32, and the information thus obtained is transmitted to the module base (substrate) 26 of the panel module 22A as AND/LED information of, e.g., transmission rate of 16 Kbps. On the other hand, operation information of switch transmitted from the module base (substrate) 26 of the panel module 22A is transmitted to the system control unit 11 through the connector 34 as it is.

With respect to the power supply system, in order not to undergo influence of voltage drop during transmission, second power supply voltage of, e.g., 12V higher to some degree than first power supply voltage used in the panel modules 22A to 22D is supplied from the system control unit 11 to the main base (substrate) 25. This second power supply voltage of 12V is converted into first power supply voltage, i.e., power supply voltage for logic (e.g., 3.3 V) and power supply voltage for LCD (e.g., 7V) at the DC-DC converter 33. The logic power supply voltage is supplied to logic circuit within the main base (substrate) 25, and is further given (supplied) to the module base (substrate) 26 of the panel module 22A along with power supply voltage for LCD and power supply voltage of 12V.

On the module base (substrate) 26 of the panel module 22A, there are mounted an ID information generating unit 35, switch matrix circuits $36_{-1}$ to $36_{-i}$, a demultiplexer 37, AND control circuits $38_{-1}$, to $38_{-j}$, LED matrix circuits $39_{-1}$ to $39_{-k}$, a multiplexer 40, and LCD control circuits $41_{-1}$ to $41_{-n}$. Here, i, j, k, n are arbitrary integers, and their values are determined by the number of switches, the number of ANDs, the number of LEDs and the number of LCDs mounted on the panel module 22A.

Here, while explanation has been given by taking, as an example, the configuration of the module base (substrate) 26 of the panel module 22A, the fundamental configuration is the same also in connection with respective module bases (substrates) of panel modules 22B to 22D, it is only different that the number of switch matrix circuits $36_{-1}$ to $36_{-i}$, the number of AND control circuits $38_{-1}$ to $38_{-j}$, the number of LED matrix circuits $39_{-1}$ to $39_{-k}$, and the number of LCD control circuits $41_{-1}$ to $41_{-n}$ are varied in accordance with the number of switches, the number of ANDs, the number of LEDs and the number of LCDs mounted on respective modules.

The ID information generating unit 35 generates a predetermined module ID information (identification information) for identifying the panel module 22A from other module. This identification information may be peculiar information every modules, or may be adapted so that the same identification information is added if function, etc. is the same module. Respective switch matrix circuits $36_{-1}$ to $36_{-i}$ grasp ON/OFF states of a large number of individual switches mounted on the panel module 22A with, e.g., 64 (=8×8) switches being as unit to output ON/OFF information thereof. The ON/OFF information of individual switches outputted from these switch matrix circuits $36_{-1}$ to $36_{-i}$ are transmitted to the main base (substrate) 25 with ID information generated at the ID information generating unit 35 being as the leading information.

The demultiplexer 37 demultiplexes AND/LED information transmitted from the main base (substrate) 25 to supply such information to the AND control circuits $38_{-1}$ to $38_{-j}$ and LED matrix circuits $39_{-i}$ to $39_{-k}$. The AND control circuits $38_{-1}$ to $38_{-j}$ drive corresponding ANDs on the basis of AND information supplied from the demultiplexer 37. The LED matrix circuits $39_{-1}$ to $39_{-k}$ also lighting-drive corresponding LEDs on the basis of supplied LED information with, e.g., 64 LEDs being as unit similarly to the switch matrix circuits $36_{-1}$ to $36_{-i}$. The LCD control circuits $41_{-1}$, to $41_{-n}$ lighting-drive corresponding LCDs on the basis of supplied LCD information.

It is to be noted that the operations of the AND control circuits $38_{-1}$ to $38_{-j}$, LED matrix circuits $39_{-1}$ to $39_{-k}$ and LCD control circuits $41_{-1}$ to $41_{-n}$ which have been explained here are the operations when AND/LED/LCD information of the panel module 22A are supplied, and when AND/LED/LCD information of other panel modules are supplied, operation like shift register which only transfers those information is carried out.

At the time of this transfer operation, AND information via AND control circuits $38_{-1}$ to $38_{-j}$ and LED information via LED matrix circuits $39_{-1}$ to $39_{-k}$ are multiplexed at the multiplexer 40 for a second time, and the information thus obtained is delivered to the relay base (substrate) 24 together with LCD information via LCD control circuits $41_{-1}$ to $41_{-n}$. It is to be noted that power supply voltage of 12V is passed through the module base (substrate) 26 as it is, and is delivered to the relay base (substrate) 24.

While explanation has been given here mainly in connection with transmission of data, since switching of video signal is carried out in synchronism with video signal, acquisition of operation information at the switch matrix circuits $36_{-1}$ to $36_{-i}$ and drive of LED at LED matrix circuits $39_{-1}$ to $39_{-k}$, etc. are carried out in synchronism with video signal by using, as a control signal, vertical synchronizing signal VD and horizontal synchronizing signal HD obtained after undergone synchronization separation from video signal, and reference clock CLK of this system.

Figure 6:
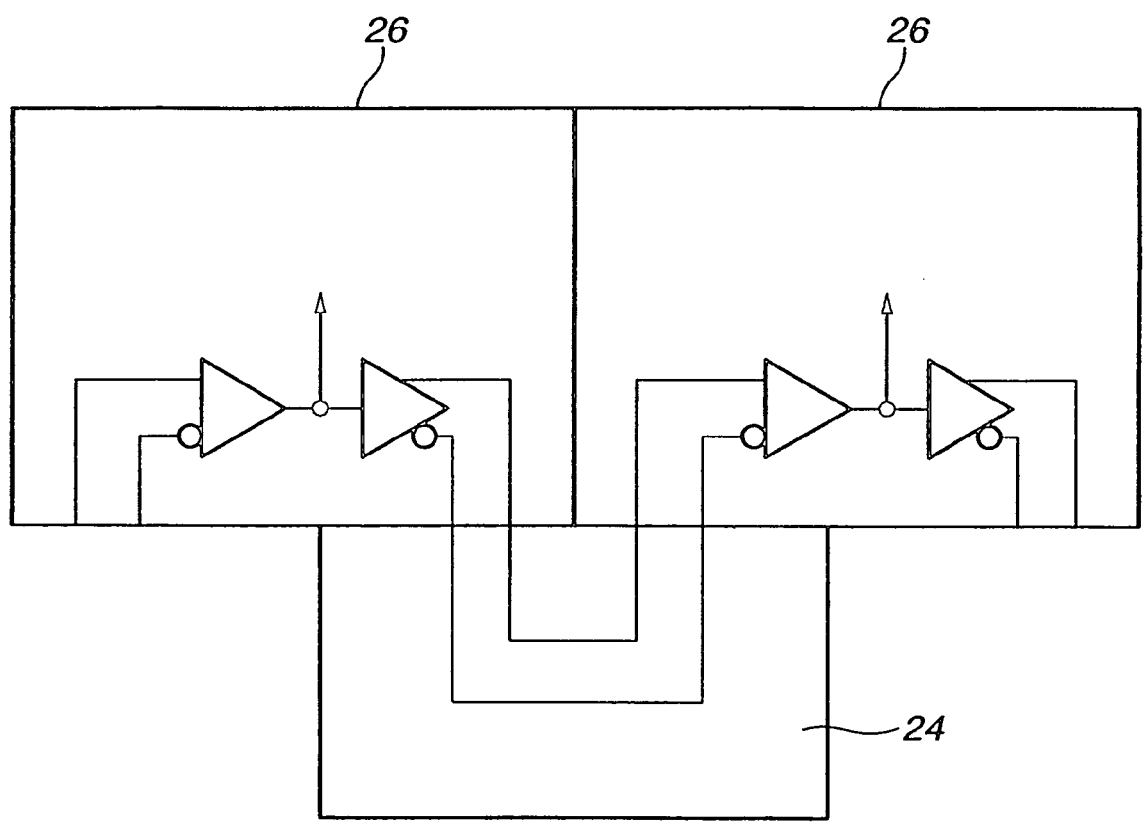
FIG. 6 is a circuit diagram showing the configuration of data transmission system between relay base (substrate) and module base (substrate).
Figure 7:
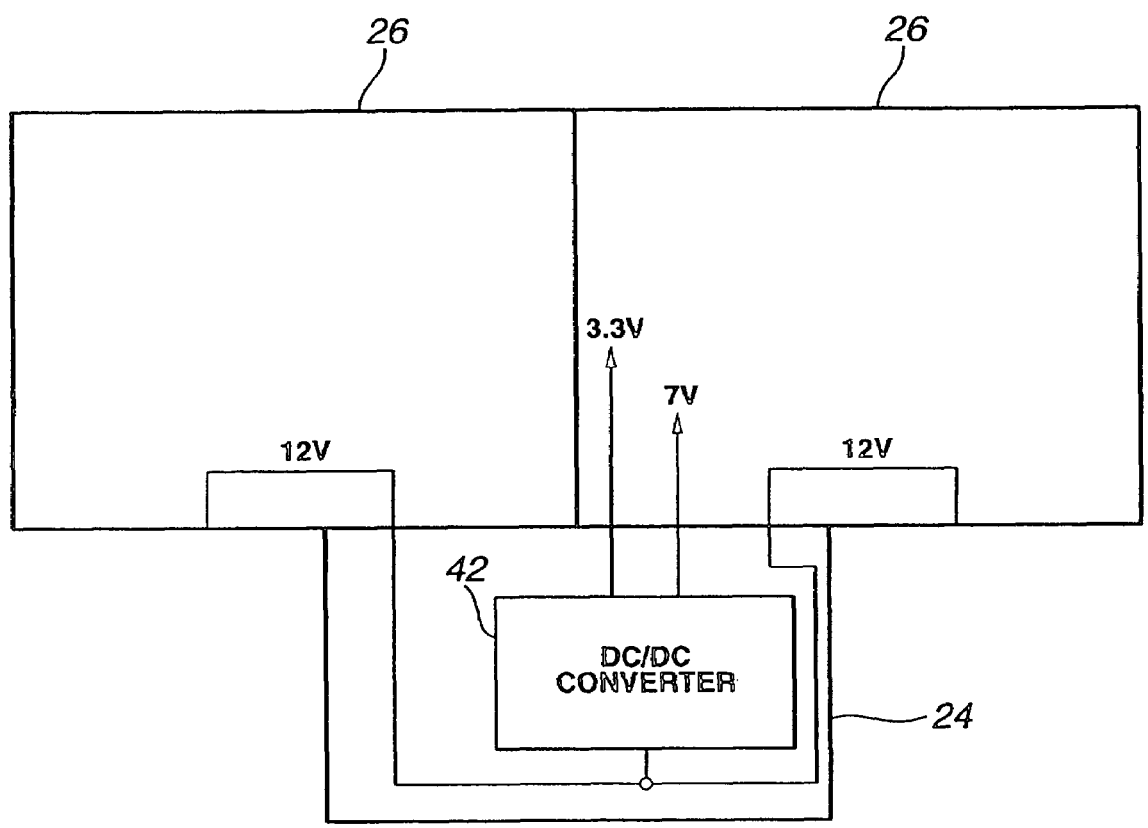
FIG. 7 is a circuit diagram showing the configuration of power supply system between the relay base (substrate) and the module base (substrate).

As shown in FIG. 6, the relay base (substrate) 24 is connected to respective module bases (substrates) 26, 26 of adjacent panel modules by connectors in a manner previously described above to carry out delivery or transfer of AND/LED information, LCD information and switch information between both respective module bases (substrates) 26, 26. On the other hand, with respect to the power supply system, as shown in FIG. 7, a DC-DC converter 42 is mounted on the relay base (substrate) 24.

This DC-DC converter 42 converts power supply voltage of 12V supplied through the module base (substrate) 26 of the panel module of the preceding stage into power supply voltage for logic (3.3 V in this example) and power supply voltage for LCD (7V in this example) to supply them to the module base (substrate) 26 of the panel module of the succeeding stage. The power supply voltage of 12V is passed through the module base (substrate) 26 of the panel module of the succeeding stage as it is, and is supplied to the next relay base (substrate) 24.

As stated above, there is employed the configuration that DC-DC converters 42 are mounted on respective relay bases (substrates) 24 to convert power supply voltage of 12V into power supply voltages of 7V and 3.3V in respective module units, whereby necessary power supply voltage can be supplied to respective module panels at all times without experiencing voltage drop during transmission, and it is not required to mount DC-DC converter 42 on module base (substrate) 26 attached to the panel module. For this reason, there is also the merit that the configuration of the module base (substrate) 26 can be simplified by the occupation thereof. However, the portion where voltage drop means like DC-DC converter is mounted is not limited to this position, but DC-DC converter may be mounted on module base (substrate).

Figure 8:
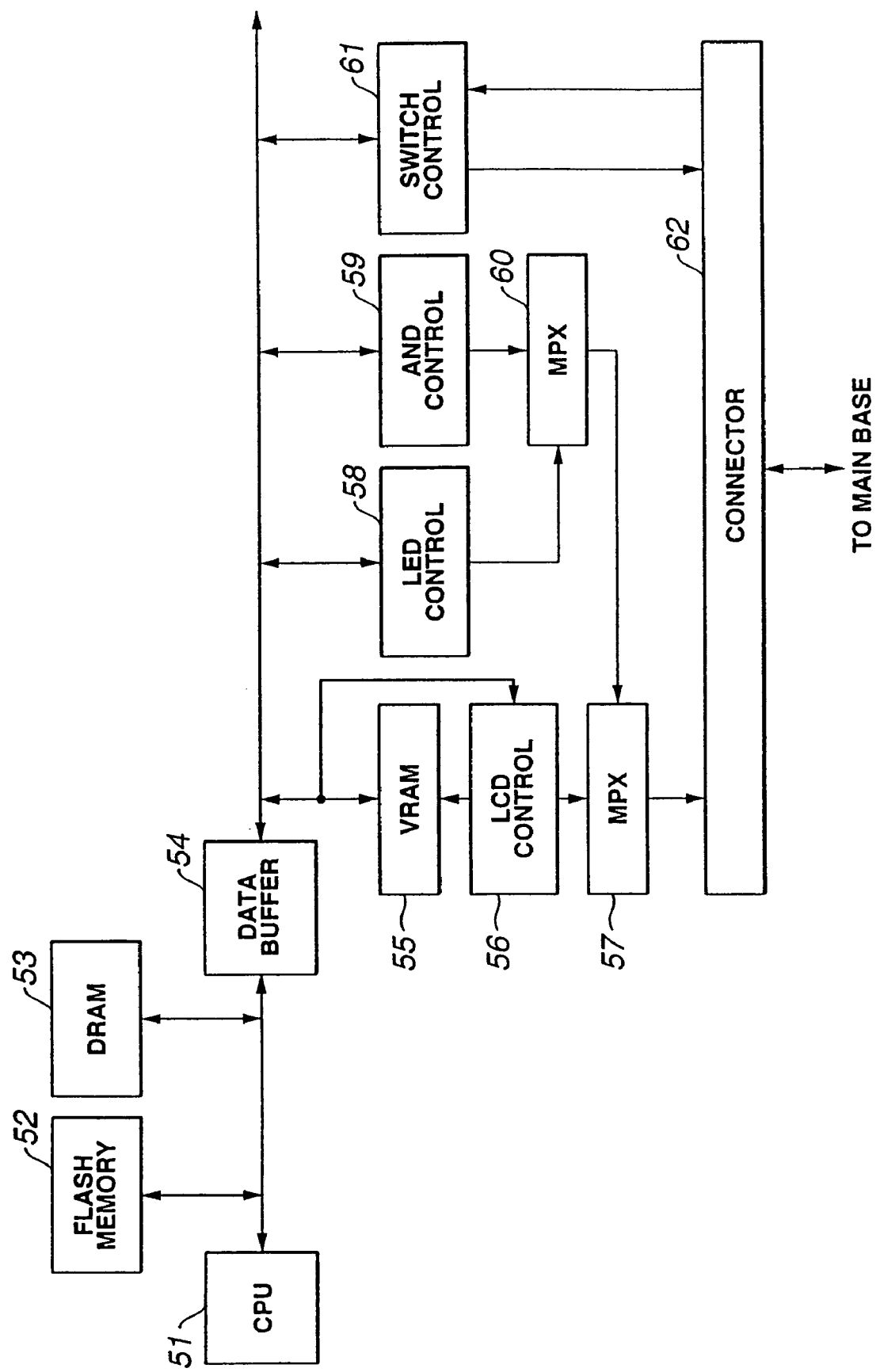
FIG. 8 is a block diagram showing an example of system control unit.

FIG. 8 is a block diagram showing an example of the configuration of the system control unit 11. The system control unit 11 includes, as shown in FIG. 8, a CPU 51, a flash memory 52, a DRAM 53, a data buffer 54, a VRAM 55, a LCD control section 56, a multiplexer 57, a LED control section 58, an AND control section 59, a multiplexer 60, and a switch control section 61.

The CPU 51 governs control of the entirety of this system. More practical control thereof will be described later. In the flash memory 52, information relating to the main panel unit 12, the menu panel unit 13 and the first to third expansion panel units 14 to 16 are stored in advance along with operating program of the CPU 51. As a more practical example of information stored into the flash memory 52, when the case of the main panel unit 12 is taken as example, there are respective ID information of panel modules 22A to 22D constituting the main panel unit 12 and respective function information of the panel modules 22A to 22D. As respective function information of the panel modules 22A to 22D, there are information such as the number of switches, the number of ANDs, the number of LEDs and the number of LCDs, etc. mounted on respective modules.

Here, in the case where there is employed system configuration in which panel modules having special function are separately prepared except for panel modules 22A to 22D constituting the main panel unit 12 to suitably replace these modules by either ones of panel modules 22A to 22D, function information of panel modules separately prepared are also stored in advance into the flash memory 52. Thus, it is possible to always cope with change of function by replacement of module. In addition, in the case where entirely different module is newly supplemented, it is sufficient to supplementarily store function information of that module into the flash memory 52.

The DRAM 53 includes a first data area for developing data which have been read from the main panel unit 12, the menu panel unit 13 and the first to third expansion panel units 14 to 16, and a second data area for developing data given to the main panel unit 12, the menu panel unit 13 and the first to third expansion units 14 to 16, and carries out transmission/reception of data through the data buffer 54.

When the case of the main panel unit 12 is taken as example, in the DRAM 53, under control of the CPU 51, operation information of switches (hereinafter simply referred to as "switch information" as occasion may demand) supplied from the panel modules 22A to 22D of the main panel unit 12 are developed in the first data area of the DRAM as a map having correspondence relationship with respect to individual switches mounted on the panel modules 22A to 22D. Accordingly, by observing this map, it is possible to recognize which switch of the panel modules 22A to 22D is turned ON (pushed down).

In order to recognize that the switch is turned ON, e.g., LED corresponding to this switch is lighted. In this case, display information for lighting this LED is developed in the second data area of the DRAM as a map having correspondence relationship with respect to individual LEDs mounted on the panel modules 22A to 22D. Accordingly, this developed map information is sent to the panel modules 22A to 22D side as it is to thereby light LED corresponding to the switch which has been turned ON. Thus, operator is permitted to recognize that corresponding switch is placed in ON state.

In the VRAM 55, under control of the LCD control section 56, display information displayed on LCDs mounted on the panel modules 22A to 22D are developed. This display information, i.e., LCD information is supplied to the multiplexer 57. The LED control section 58 and the AND control section 59 generate LED information and AND information on the basis of data developed in the second data area of the DRAM 53 to supply them to the multiplexer 60.

The multiplexer 60 multiplexes LED information supplied from the LED control section 58 and AND information supplied from the AND control section 59 to supply it to the multiplexer 57 as LED/AND information. The multiplexer 57 further multiplexes LCD information supplied from the LCD control section 56 with respect to the LED/AND information supplied from the multiplexer 60 to send out it to the main panel unit 12 side through a connector 62 as LED/AND/LCD information.

The switch control section 61 temporarily stores switch information supplied from the main panel unit 12 side and inputted through the connector 62 by information corresponding to the panel modules 22A to 22D to supply such information to the DRAM 53 through the data buffer 54 in order to develop such information as a map. In the case where switch is, e.g., switch with LED, switch information for lighting LED of switch which has been turned ON is sent to the main panel 12 side through the connector 62 in a manner opposite to the above.

While explanation has been given up to now in connection with the main panel unit 12, panel modules 22A to 22D may be used by one body or plural cascade-connected panel modules 22A to 22D may be used apart from the main panel unit 12 as in the case of first to third expansion panel units 14 to 16 in this system.

Figure 9:
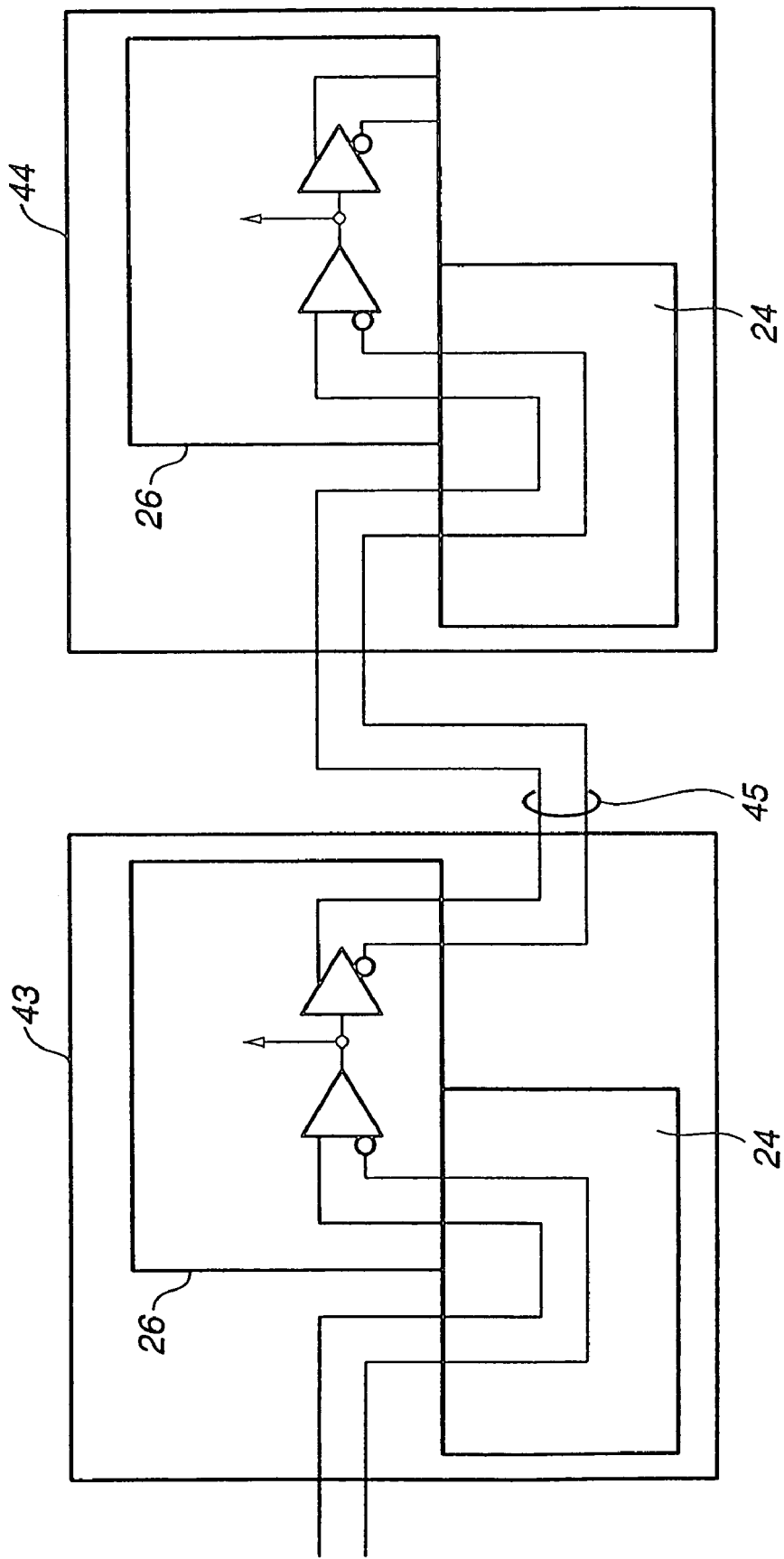
FIG. 9 is a circuit diagram showing the state where plural panel modules are cascade-connected and are used.

In the case where plural cascade-connected panel modules are used as in the case of the second and third expansion panel units 15, 16, respective panel modules are accommodated within dedicated cases. At this time, since relay base (substrate) 24 and module base (substrate) 26 of the panel module are paired as shown in FIG. 9, it is sufficient to connect connector of the module base (substrate) 26 side accommodated within one case 43 and connector of the relay base (substrate) 24 side accommodated within the other case 44 by cord 45.

Subsequently, explanation will be given in connection with one example of the operation in which the main panel unit 12 in the video switcher according to the present invention which has been explained is caused to be main. It is to be noted that the operation which has been explained below is assumed to be entirely executed under control by the CPU 51 of the system control unit 11 shown in FIG. 8. The CPU 51 repeatedly executes processing to acquire operation information of switches from panel modules 22A to 22D of the main panel unit 12, e.g., at a certain cycle of the degree of 60 times per one second while carrying out management of information relating to respective functions of panel modules 22A to 22D constituting the main panel unit 12 and panel modules separately provided to supply display information to respective panel modules 22A to 22D while making reference to information relating to respective functions which are caused to undergo management on the basis of the acquired information.

At a certain cycle, the CPU 51 reads thereinto operation information of switches from panel modules 22A to 22D of the main panel unit 12. At this time, from the main panel unit 12, in FIG. 2, operation information of switches with respect to respective panel modules of the first row (uppermost level) are transferred to the main base (substrate) 25 via the module base (substrate) of the panel modules and the relay base (substrate) 24 between panel modules in order from the left side in the figure. At this time, operation information of the panel modules are transferred in module units with ID information peculiar to respective panel modules being as leading portion. Acquisition of operation information of switches at respective panel modules and/or timing control of transfer, etc. of acquired operation information of switches are carried out on the basis of vertical synchronizing signal VD and horizontal synchronizing signal HD obtained from video signal by synchronization separation, and reference clock CLK. This transfer data of the first row is compressed at the main base (substrate) 25, and is then transmitted to the system control unit 11 through cable at a high speed.

Subsequently, operation information of switches with respect to respective panel modules of the second row are transferred to the main base (substrate) 25 via the module base (substrate) 26 of panel modules and the relay base (substrate) 24 between panel modules, and via the relay base (substrate) 23 between rows similarly to the case of the first row, and are transmitted to the system control unit 11 at a high speed subsequently to data of the first row. At times subsequent thereto, operation information of switches are transmitted to the system control unit 11 in the same manner as in the case of the third row, and the fourth row.

At the system control unit 11, compressed operation data including ID information transmitted from the main panel unit 12 are decompressed at the switch control section 61 and are temporarily entirely stored into memory included therewithin. Thereafter, such operation data thus obtained is read by the CPU 51. In this read-in operations the CPU 51 first reads ID information to thereby grasp respective absolute positions of respective panel modules, i.e., what row and line panel modules have at the main panel unit 12. Simultaneously therewith, the CPU 51 develops operation information of the switch supplied from the panel module constituting the main panel unit 12 into the first data area of the DRAM 53 as a map having correspondence relationship with respect to individual switches mounted at respective panel modules. From this map, the CPU 51 can recognize switch of panel module placed in ON (pushed down) state.

Subsequently, the CPU 51 develops, into the second data area of the DRAM 53, as a map having correspondence relationship with respect to respective LEDs, ANDs and LCDs mounted at the panel modules constituting the main panel unit 12, display information, such as, for example, information for lighting-driving LED corresponding to the switch and information for display-driving AND or LCD on the basis of the map with respect to operation information of the switch developed in the first data area of the DRAM 53.

The CPU 51 then executes a control for carrying out transmission to the main panel unit 12 side in order in module units from display information of respective panel modules of the first row of the main panel unit 12 on the basis of map with respect to display information developed in the second data area of the DRAM 53. It is to be noted that since ID information of individual panel modules constituting the main panel unit 12 and respective function information (information such as the number of switches, the number of ANDs, the number of LEDs and the number of LCDs, etc. mounted on respective modules), etc. are stored in advance in the flash memory 52, the CPU 51 grasps, on the basis of ID information which has been first read, what functions panel modules constituting the main panel unit 12 respectively have. Control means like the CPU 51 performs a role to carry out management of management information relating to respective functions of plural panel modules to acquire predetermined module identification information and operation information of respective modules from respective plural panel modules to supply predetermined function information to respective plural modules while making reference to management information on the basis of this operation information.

In transmission of display information from the system control unit 11 to the main panel unit 12, LED information and AND information are first multiplexed at the multiplexer 60, and LCD information is further multiplexed with respect to this LED/AND information at the multiplexer 57. The information thus obtained is transmitted at a high speed as LED/AND/LCD information to the main panel unit 12, e.g., in order of the first row, the second row, the third row and the fourth row of the main panel unit 12, or in order from panel module of the right side of FIG. 2 when reference is made every respective rows.

This transmission data, i.e., LED/AND/LCD information is transferred to the module bases (substrates) 26 of respective panel modules routing a path opposite to transfer path of operation information of switches. Here, with respect to LED/AND/LCD information, since such information is caused to be in correspondence with respective LEDs, ANDs and LCDs mounted on respective panel modules of the main panel unit 12 under control by the CPU 51 of the system control unit 11, it is sufficient to merely transfer data received from the system control unit 11 as it is via the module base (substrate) 26 of the panel module and the relay base (substrate) 24 between panel modules. Thus, respective information of LED/AND/LCD are finally set at LED matrix circuits $39_{-1}$ to $39_{-k}$, AND control circuits $38_{-1}$ to $38_{-j}$ and LCD control circuits $41_{-1}$ to $41_{-n}$ on module bases (substrates) 26 of corresponding panel modules so that display drive is carried out.

The above-mentioned series of operations are repeated at high speed period, e.g., the degree of 60 times per one second, whereby lighting-drive is carried out at that period with respect to, e.g., LED which displays ON state of a certain switch. In this case, since that period is short, it looks like that the LED visually continuously lighted.

As described above, the video switcher according to the present invention allows the operation unit to be of modular configuration every respective functions, and employs the configuration of connector connection with respect to the electrical connection between respective mutual operation modules, thereby making it possible to freely change layout of respective functions of the operation unit in accordance with fondness of operator. The attachment position of the relay base (substrate) is not limited to the case where change into pitch of the above-described minimum module size can be made or attachment thereto can be made, but change into either position may be made and attachment of the relay base may be also made. In the case where the wiring system is caused to be of relay base (substrate) configuration, harnessless structure is employed, whereby assembling ability can be improved, and reduction effect of unnecessary radiation can be also obtained.

The lateral width of panel module is not limited to division size of width of the base unit or the panel module, but can be determined in accordance with the function that the panel module is caused to have such as the number of buttons arranged or arrangement thereof. For example, in the case where there is employed division size in which 19 inches rack size is fundamental, kind in point of size of base unit and panel module of the main panel unit 12 can be unified into several kinds. For this reason, mass-production can be made in a manner including realization of metal mold. As a result, low cost of the video switcher by mass-production effect can be realized.

With respect to the panel module, since it is possible to freely select panel modules which have necessary functions, it is possible to simply and freely construct video switcher which has only functions that user requires. For this reason, size of the main body of the video switcher can be freely selected by combination of sizes of panel modules, and burden in point of cost of user can be further lessened. Moreover, with respect to panel module having special function, function addition/change based on suitable replacement at the necessary time can be made. For this reason, as compared to the case where the video switcher has all functions from the beginning, size of the main body of the video switcher can be reduced accordingly, and the video switcher can be constituted at low cost.

At the system control unit 11 side, there is employed the configuration to carry out management of respective panel modules constituting the main panel unit 12 on the basis of ID information, and to carry out exchange of operation information of switches and/or respective display information of LED/AND/LCD between the system control unit 11 and respective panel modules on the basis of that management information. For this reason, even in the case where the same panel module configuration is employed, display information given, etc. is changed, thereby also making it possible to change function of the panel module. In other words, the same panel modules are permitted to have different plural functions.

There may be also employed an approach to incorporate, into the video switcher, program adapted for carrying out management of management information relating to respective functions of plural panel modules disposed on the base unit to acquire predetermined module identification information and operation information of respective modules from respective plural panel modules to supply predetermined function information to the respective plural operation modules while making reference to management information on the basis of operation information to thereby control panel module. That program may be also incorporated through network.

An apparatus may be caused to have, in addition to the video signal switching apparatus, function of control means which performs a role to carry out management of management information relating to respective functions of plural panel modules to acquire predetermined module identification information and operation information of respective modules from respective plural panel modules to supply predetermined function information to respective plural modules while making reference to management information on the basis of the operation information so that the video signal switching apparatus can be remotely controlled through, e.g., network.

INDUSTRIAL APPLICABILITY

As explained above, the present invention is adapted to allow the operation unit to be of modular configuration every respective functions, thereby making it possible to freely change layout of respective operation modules in accordance with fondness of operator. In addition, in the case where the wring system is caused to be relay base (substrate) connection, it is not required to employ the configuration of the harness connection. For this reason, assembling ability can be improved, and unnecessary radiation can be reduced.

The invention claimed is:

1. A video signal switching apparatus comprising:
   plural modules, disposed on a base unit, for serving to respectively execute predetermined functions;
   relay means for electrically and detachably connecting adjacent modules of the plural modules to each other to carry out transmission signals between said modules; and
   control means for carrying out management of information relating to respective functions of the plural modules, and controlling the plural modules,
   wherein layout order of modules is changeable in accordance with a user preference.

2. The video switching apparatus according to claim 1, wherein the relay means electrically and detachably connect the modules of respective rows to each other.

3. The video switching apparatus according to claim 1, wherein the relay means are disposed between respective rows of the modules for electrically and detachably connecting the modules of respective rows to each other.

4. The video switching apparatus according to claim 1, wherein plural relay means are disposed within a row of the modules for electrically and detachably connecting the adjacent modules within the row.

5. The video switching apparatus according to claim 1, wherein the relay means are attached to the base unit and the modules are detachably connected to the relay means by connectors.

6. The video switching apparatus according to claim 1, wherein the relay means are disposed between respective rows of the modules for electrically and detachably connected the modules of respective rows to each other and plural relay means are disposed within a row of the modules for electrically and detachably connecting the adjacent modules within the row.

* * * * *